(12) United States Patent
Mazzola et al.

(10) Patent No.: US 7,563,504 B2
(45) Date of Patent: Jul. 21, 2009

(54) UTILIZATION OF DISCONTINUOUS FIBERS FOR IMPROVING PROPERTIES OF HIGH TEMPERATURE INSULATION OF CERAMIC MATRIX COMPOSITES

(75) Inventors: Stefan Mazzola, Sanford, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 610 days.

(21) Appl. No.: 11/235,496

(22) Filed: Sep. 26, 2005

(65) Prior Publication Data
US 2006/0019087 A1    Jan. 26, 2006

Related U.S. Application Data

(60) Continuation-in-part of application No. 10/667,264, filed on Sep. 19, 2003, now Pat. No. 7,179,524, which is a continuation-in-part of application No. 09/536,742, filed on Mar. 28, 2000, now Pat. No. 6,977,060, and a continuation-in-part of application No. 09/507,794, filed on Feb. 22, 2000, now Pat. No. 6,676,783, which is a division of application No. 09/428,197, filed on Oct. 27, 1999, now Pat. No. 6,287,511, which is a division of application No. 09/049,328, filed on Mar. 27, 1998, now Pat. No. 6,013,592, application No. 11/235,496, filed on Sep. 26, 2005, and a continuation-in-part of application No. 10/648,922, filed on Aug. 27, 2003, now Pat. No. 7,198,462, which is a continuation of application No. 09/467,237, filed on Dec. 20, 1999, now Pat. No. 6,641,907, application No. 11/235,496, filed on Sep. 26, 2005, and a continuation-in-part of application No. 10/634,391, filed on Aug. 5, 2003, now Pat. No. 7,067,181.

(51) Int. Cl.
*B32B 3/00* (2006.01)
*B32B 3/26* (2006.01)
*B32B 18/00* (2006.01)
*C03C 13/00* (2006.01)

(52) U.S. Cl. ............. 428/314.2; 428/309.9; 428/313.3; 428/314.4; 428/316.6; 428/317.7; 428/318.4; 428/323; 428/325; 428/322.7; 428/221; 428/688; 501/35

(58) Field of Classification Search ................. None
See application file for complete search history.

(56) References Cited

U.S. PATENT DOCUMENTS

| 3,325,341 A | | 6/1967 | Shannon |
| 3,935,060 A | * | 1/1976 | Blome et al. ................ 162/152 |
| 4,035,545 A | | 7/1977 | Ivanov et al. |

(Continued)

FOREIGN PATENT DOCUMENTS

WO    WO 03/026886 A2    4/2003

OTHER PUBLICATIONS

Fibers for Ceramic Matrix Composites, Bernd Claub, Ceramic Matrix Composites, Edited by Walter Krenkel, Copyright 2008 WILEY-VCH Verlag GmbH & Co. KGaA, Weinheim ISBN: 978-3-527-31361-7.

*Primary Examiner*—Ling Xu (57) ABSTRACT

An insulating material 14 adapted for use in a high temperature environment for coating a turbine component is provided. The insulating material comprises a plurality of geometric shapes 18. The insulating material further comprises a binder for binding together the geometric shapes. A plurality of discontinuous fibers is added to the binder. The discontinuous fibers are adapted to controllably affect one or more properties of the insulating material. For example, non-fugitive chopped fibers 50 may be added to affect a tensile strength property of the insulating material, and fugitive chopped fibers 52 may be added to affect a density property of the insulating material.

12 Claims, 5 Drawing Sheets

U.S. PATENT DOCUMENTS

| | | | |
|---|---|---|---|
| 4,423,097 A | 12/1983 | Mons et al. | |
| 4,450,184 A | 5/1984 | Longo et al. | |
| 4,639,388 A | 1/1987 | Ainsworth et al. | |
| 4,775,598 A | 10/1988 | Jaeckel | |
| 4,867,639 A | 9/1989 | Strangman | |
| 4,916,022 A | 4/1990 | Solfest et al. | |
| 5,002,904 A | 3/1991 | Jain et al. | |
| 5,014,396 A * | 5/1991 | Nieminen | 19/205 |
| 5,064,727 A | 11/1991 | Naik et al. | |
| 5,180,285 A | 1/1993 | Lau | |
| 5,312,660 A * | 5/1994 | Morris et al. | 428/36.3 |
| 5,683,825 A | 11/1997 | Bruce et al. | |
| 5,705,008 A * | 1/1998 | Hecht | 156/148 |
| 5,780,146 A | 7/1998 | Mason et al. | |
| 5,820,976 A | 10/1998 | Kamo | |
| 5,854,154 A | 12/1998 | Radford et al. | |
| 5,952,075 A * | 9/1999 | Clarke et al. | 428/66.2 |
| 5,985,368 A | 11/1999 | Sangeeta et al. | |
| 6,013,592 A | 1/2000 | Merrill et al. | |
| 6,197,424 B1 | 3/2001 | Morrison et al. | |
| 6,235,370 B1 | 5/2001 | Merrill et al. | |
| 6,287,511 B1 | 9/2001 | Merrill et al. | |
| 6,514,046 B1 | 2/2003 | Morrison et al. | |
| 6,528,190 B1 | 3/2003 | Campbell et al. | |
| 6,641,907 B1 | 11/2003 | Merrill et al. | |
| 2001/0009717 A1 * | 7/2001 | Higashiyama et al. | 428/318.8 |
| 2002/0168505 A1 | 11/2002 | Morrison et al. | |
| 2003/0059577 A1 | 3/2003 | Morrison et al. | |
| 2003/0080477 A1 | 5/2003 | Merrill et al. | |

* cited by examiner

UTILIZATION OF DISCONTINUOUS FIBERS FOR IMPROVING PROPERTIES OF HIGH TEMPERATURE INSULATION OF CERAMIC MATRIX COMPOSITES

RELATED APPLICATIONS AND PATENTS

The present application is a continuation-in-part of and claims benefit of the filing dates of application Ser. No. 10/667,264 filed Sep. 19, 2003, now U.S. Pat. No. 7,179,524 which in turn is a continuation-in-part of application Ser. No. 09/536,742 filed Mar. 28, 2000, now U.S. Pat. No. 6,977,060 and of application Ser. No. 09/507,794 filed Feb. 22, 2000 (now U.S. Pat. No. 6,676,783), which in turn is a divisional of application Ser. No. 09/428,197 filed Oct. 27, 1999 (now U.S. Pat. No. 6,287,511), which is a divisional of application Ser. No. 09/049,328 filed Mar. 27, 1998 (now U.S. Pat. No. 6,013,592). The present application is also a continuation-in-part of and claims benefit of application Ser. No. 10/648,922 filed Aug. 27, 2003, now U.S. Pat. No. 7,198,462 which in turn is a continuation of application Ser. No. 09/467,237 filed Dec. 20, 1999 (now U.S. Pat. No. 6,641,907). The present application is also a continuation-in-part of and claims benefit of application Ser. No. 10/634,391 filed Aug. 5, 2003 now U.S. Pat. No. 7,067,181. Each of these earlier patent applications and/or patents is incorporated by reference herein.

FIELD OF THE INVENTION

This invention relates generally to the field of materials and, more particularly, to ceramic materials adapted for use in high temperature environments.

BACKGROUND OF THE INVENTION

Commercially available ceramic matrix composites (CMC's) have many potential applications in high temperature environments. CMC's are limited in their capability for exposure to temperatures near 1,200° C. In addition, CMC's cannot be cooled effectively under high heat flux conditions because of their relatively low thermal conductivity. Accordingly, it is desirable to provide a thermally insulating material for application to a ceramic matrix composite substrate material so that the insulated CMC composite can be used in a high temperature environment such as the hot gas flow path of a gas turbine engine.

BRIEF DESCRIPTION OF THE DRAWINGS

Advantages of the present invention will become more apparent from the following description in view of the drawings wherein.

DETAILED DESCRIPTION OF THE INVENTION

Figure 1:
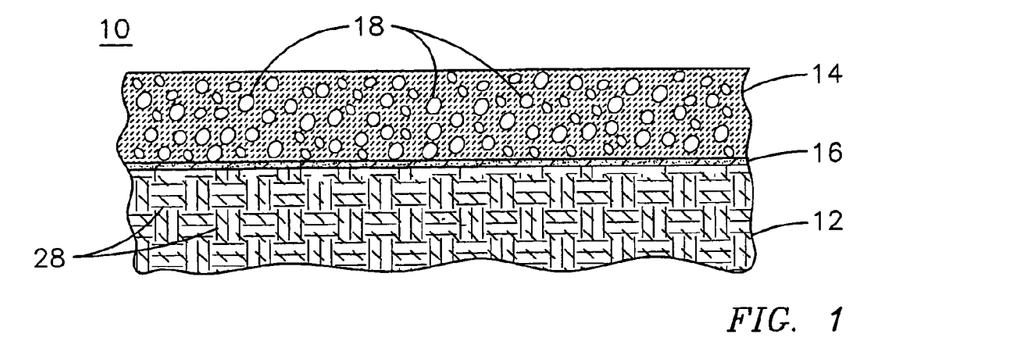
FIG. 1 is a partial cross-sectional view of a gas turbine component formed of a structural CMC substrate material covered by a layer of ceramic thermal insulation.

A gas turbine component is formed of a composite material 10 illustrated in partial cross-sectional view in FIG. 1. The composite material includes a structural ceramic matrix composite (CMC) substrate material 12 protected by a layer of ceramic insulating material 14. This ceramic insulating material is colloquially referred to by the assignee of the present invention as friable graded insulation (FGI). Various exemplary FGI materials and methodologies for making such materials are described in the various patents and applications cited in the paragraph of the present specification designated as "Related Applications and Patents".

A layer of adhesive or other bond-enhancing material 16 may optionally be used between the CMC material 12 and the insulating material 14. The composite material 10 may be used to form a vane, combustor, blade ring or other such part of a gas turbine engine that is exposed to a high temperature environment where temperatures may exceed 1,700° C.

The CMC material 12 may be any known composite material having ceramic reinforcing structures disposed in a ceramic matrix material. Both oxide/oxide and non-oxide/non-oxide CMC materials are known. In one embodiment the CMC material 12 may be a commercially available oxide/oxide composite sold under the brand name AS/N720-1 by COI Ceramics, Inc. of San Diego, Calif. AS/N720-1 material utilizes Nextel® N720 fibers (85% alumina and 15% silica in the form of mullite and alumina polycrystals) disposed in an aluminosilicate matrix, and it has an advertised continuous use temperature of 1,000° C. Accordingly, for use in an environment of temperatures greater than that value, a protective layer of thermally insulating material 14 is desirable.

U.S. Pat. No. 6,013,592 describes high temperature insulation for ceramic matrix composites. The insulating material utilizes a plurality of hollow oxide-based spheres of various dimensions, a phosphate binder and an oxide filler powder. The spheres are situated in the phosphate binder and filler powder such that each sphere is in contact with at least one other sphere in some form of close-packed arrangement, thereby providing dimensional stability to the insulation. The '592 patent also discloses the use of a coating of mullite or alumina between the insulating material and an underlying CMC material in order to prevent damage to the fibers of the CMC material.

It is possible to separately form a CMC layer and an insulation layer, then to join those two layers together with an adhesive. U.S. patent application Ser. No. 10/667,262 describes an improvement in the manufacturing of such a CMC composite through co-processing of the two materials. More particularly, it was observed that if the materials of the '592 patent are co-processed, the aluminum ortho-phosphate binder used in the insulating material tends to degrade the Nextel® fibers in AS/N720-1 CMC material during the high temperature co-processing steps. The composite material 10 described in the Ser. No. 10/667,262 application utilizes an aluminumoxychloride binder in the insulating material 14 to prevent such a degradation, thereby allowing the two layers 12 and 14 to be sinter-bonded together in a co-processing step, with or without an intermediate bond-enhancing layer 16.

Figure 2:
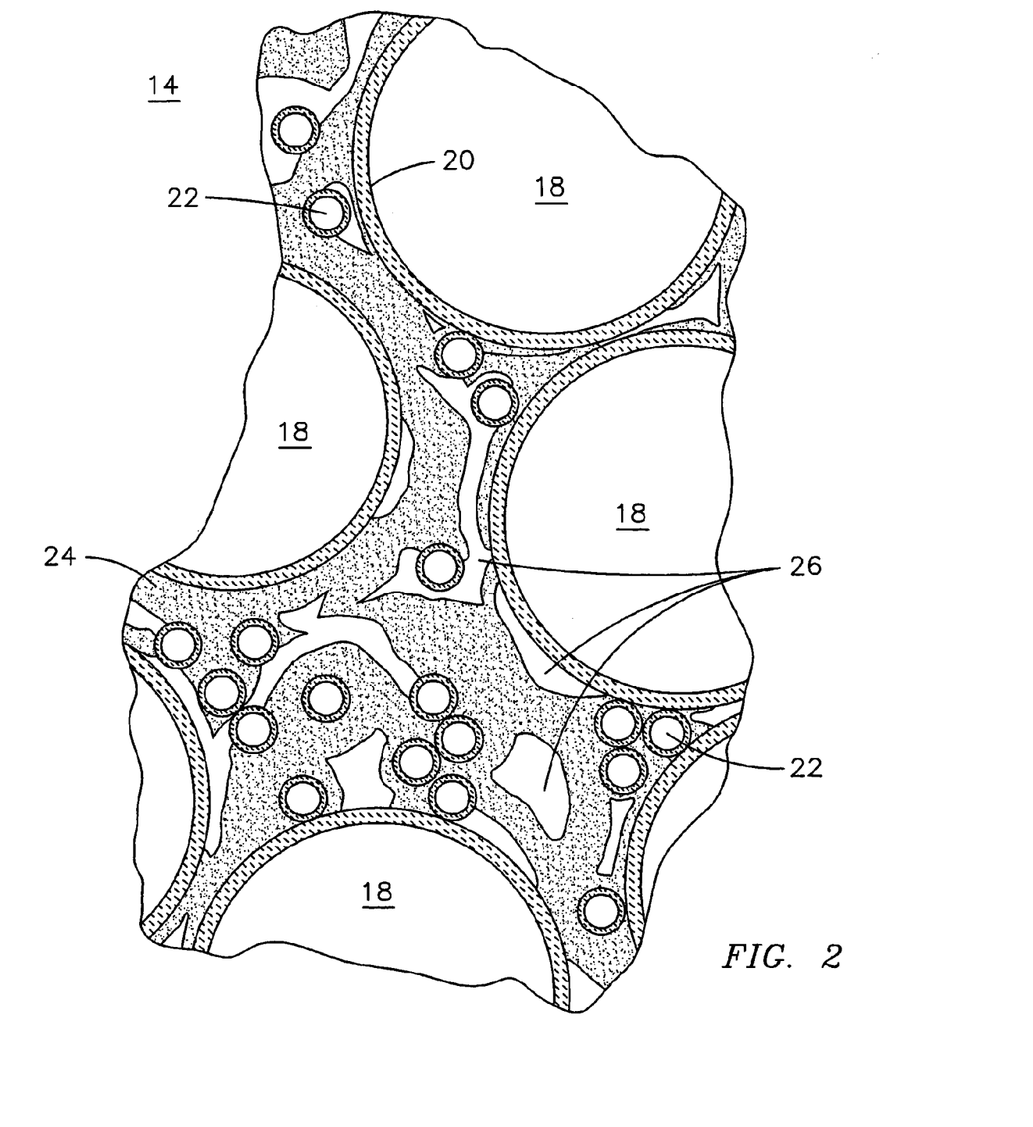
FIG. 2 is a partial cross-section view of the insulating material of FIG. 1.

FIG. 2 is a partial cross-sectional view of insulating layer 14. Hollow particles 18, such as the illustrated hollow spheres having walls 20, are shown substantially close packed with optional filler material 22, such as the illustrated smaller hollow spheres, with matrix binder material 24 disposed in the spaces between the hollow spheres 18 and the filler material 22. Voids 26, such as cracks or fractures, that may be formed in the insulating material are also shown. In other embodiments, the hollow particles 18 may be substituted with solid particles or aggregate particles, or they may be formed of a structurally rigid material having a significant void fraction in order to provide the desired mechanical strength and thermal insulation properties. In one embodiment, the hollow particles 18 may be made of material that is 82% mullite and 18% alumina. The filler material may alternatively take the form of solid particles, fibers, whiskers, aggregations, etc. In one embodiment, the filler material is a 50%/50% mixture of alumina powders of two different size ranges, such as 20 micron particles and 0.3 micron particles. The illustrated hollow ceramic spheres 18 are manufactured such that the sphere walls 20 are near 70% to 100% of theoretical density, preferably near 90% to 100% of theoretical density (0% to 10% porous). For good erosion resistance, the wall thickness is preferably between about 100 micrometers to 400 micrometers, depending on sphere diameter. The hollow ceramic spheres control the dimensional stability of the insulating material 14 and inhibit gross volumetric shrinkage due to sintering of the matrix, regardless of the matrix binder material that may be selected. The level of closed macroscopic porosity within the material 14 is affected by the overall size of the hollow ceramic spheres, the wall thickness of the spheres, and their packing arrangement within the structure. The binder 24 that interstitially bonds the hollow ceramic spheres together may also contribute to these properties depending on the mechanical and thermal properties and the amount of binder materials used. The structure of the material 14 imparts unique combinations of properties including, in the case of gas turbine applications, excellent erosion resistance, insulating properties, and abradability in an optimized combination not achieved by conventional means.

The material 14 shown in FIG. 2 is made with closed macroscopic porosity via the use of solid or hollow ceramic particles, such as hollow spheres 18 of size ranges between 200 micrometers diameter to 1800 micrometers diameter for example. The spheres may be independently formed and subsequently bonded together to form a macroscopic infrastructure. The bulk density of these spheres 18 themselves is anywhere between 0.1 and 0.9 of theoretical, that is 10% to 90%, taking into account the internal porosity, and depending upon the needs for each high temperature application. The close-packed, contiguous structure defines and controls the thermal and mechanical properties of the system 60 and maintains dimensional stability of the structure. Coordination numbers for the sphere packing can range from 1 to 14, but preferably, the coordination number of substantially all of the hollow shapes is from 5 to 12, and even more ideally from 5 to 8 for gas turbine coating applications. Some degree of randomness is preferred for maximum fracture toughness and strength. However, idealized packing arrangements and size distributions and high coordination numbers in the 8 to 14 range may be preferred for stiffness-driven applications such as cores for sandwich structures.

Spheres 18 may be separately formed and stabilized as opposed to being formed in-situ. The individually formed and bonded spheres can impart unique properties to the material 14. Contact between dense-walled spheres is not overly intimate due to the binder and possibly smaller included spheres, thus allowing crack deflection and some degree of toughening of the material. Forming the spheres separately allows the stabilization of the spheres to a much higher temperature than otherwise possible.

For some applications, the absolute value of the wall thickness is important to achieving adequate erosion resistance. Therefore, the ratio of wall thickness to sphere radius (t/r) and overall diameter of the spheres is considered. For example, if a 200 micrometer wall thickness is required for erosion resistance, and the overall bulk density of the material system is defined by abradability requirements, that is about 60%, this helps narrow down the range of sphere sizes possible. Other variables include sphere packing density and matrix density. Wall thickness will generally range from about 0.05 mm to 0.5 mm and may be about 0.15 mm.

The shape of the hollow particles may be spherical for ease of manufacture and for attaining isotropic properties. However, other similar shapes can be readily made and incorporated in like manner and can introduce certain optimized properties. For example, the shapes can be hollow elongated spheroids or needlelike shapes, either randomly oriented or preferentially oriented parallel or perpendicular to the substrate surface and having aspect ratios less than 5-to-1 and lengths between 200 micrometers and 1800 micrometers. Hollow ellipsoids or other irregular spheroids can be made and indeed are within the normal range of sphere manufacture. Mixtures of spheres, spheroids, low aspect ratio cylinders and other shapes are also natural extensions and, in fact, at least one manufacturing process for hollow spheres also produces hollow, long needle structures. In certain embodiments the particles need not be hollow, but rather may be uniformly solid throughout.

Overall bulk density of the entire material system, including the sphere density, their packing arrangement, and the matrix/filler/binder material is generally in the range of 0.10 to 0.80 of theoretical density, depending on the application. For the example of turbine engine coatings for either insulation or abradability (or both), the range of overall density of the material system and its makeup can vary over a wide range. By controlling the bulk density, that is sphere size, sphere wall thickness and binder density of the material system, the properties can be optimized for erosion resistance and/or abradability. The best range for abradable coatings is 30% to 80% theoretical density. The best range for erosion resistance is from about a 0.3 to 0.5 t/r within the 30% to 80% range.

The insulation material 14 may utilize regular packing of uniformly sized spheres 18, however, the packing of the spheres 18 is not limited to a specific form, nor is it limited to uniformly sized spheres, nor is it limited to any kind of regularity of structure. Random packing is allowable, and non-uniform sphere sizing may be desirable to achieve higher sphere packing densities. In certain embodiments, the spheres may be loosely distributed within the matrix material, thereby being subject to much greater sintering shrinkage during processing. For example, the Ser. No. 10/667,262 patent application describes a method that can accommodate both close-packed embodiments having limited shrinkage and non-packed embodiments having much greater shrinkage.

Sphere walls should be over 70% dense, but are preferably near theoretical density (90% to 100% of theoretical density) to maintain thermal stability over the widest range of temperatures. The high density of the sphere walls imparts excellent erosion resistance and controls the thermal and mechanical behavior of the system. The manufacturing temperature of the hollow spheres is well in excess of the intended use temperature of the material system, for example, mullite ($3Al_2O_3.2SiO_2$) hollow spheres can be manufactured at 1740° C., rendering them inert and stable in a material system operating indefinitely at 1600° C. to 1700° C. Separately forming and stabilizing the spheres to high temperatures ensures the thermal and dimensional stability of the system at future high temperature operating ranges up to 1700° C. and possibly beyond. The hollow ceramic spheres, rods, etc. are bonded together interstitially by a ceramic matrix material to form a contiguous and self-supporting structure. The volume content of the matrix material can vary from near zero to completely filling in the interstitial space between the hollow shapes. Preferably the matrix constitutes a minimum of 10% of the interstitial space between the hollow shapes for all coordination members. The matrix content and density are tailored to achieve the desired properties for the specific application, taking into account: the desired bond strength between hollow shapes; the overall bulk density required for abradability purposes; the individual and packing densities of the hollow shapes; permeability requirements; overall mechanical strength of the system; overall thermal conductivity properties desired; and mass considerations (for example, for flight applications).

As described in greater detail below, the matrix may or may not contain filler material 22, including but not limited to smaller hollow spheres or other geometric shapes, powders, particles, platelets, and whiskers or chopped fibers or other discontinuous fibrous materials. In the case of thick-walled shapes where t/r is greater than 0.25, it may be advantageous to minimize the amount of matrix in the system—so long as the bond strength and other criteria are met. A very strong structure, particularly in compression, can be achieved with relatively little matrix addition.

The composition of the ceramic hollow shapes 18, 22 can be any oxide or non-oxide ceramic material including (but not limited to) those shown in Table 1 below:

TABLE 1

| OXIDES | CARBIDES | NITRIDES |
| --- | --- | --- |
| Alumina, Silica | SiC, WC, NbC | $Si_3N_4$, TiN |
| Mullite, Zirconia | TaC, HfC, ZrC | SiCN |
| Zircon, YAG, Yttria | TiC | |
| Ceria, Hafnia, Beryllia | | |

Typically, high temperature, stable ceramic particulate filler materials may be used to add density to the matrix (without necessarily adding strength), to add strength to the matrix, to add toughness to the matrix either via reinforcing or residual stress management, or to improve the volumetric yield of matrix infiltrates (cost savings). Typically, the filler material 22 in the slurry-based binder 24 may be of the composition but not limited to those in Table 2 below, and typical binders 24 are listed in Table 3 below.

| TABLE 2 FILLER | | TABLE 3 BINDER |
| --- | --- | --- |
| Mullite | with | Aluminosilicate and/or Aluminumphosphate |
| Alumina | with | Aluminumphosphate and/or Aluminumoxychloride |
| Zirconia | with | Aluminumorthophosphate |
| Hafnia | with | Aluminumorthophosphate |
| Yttria | with | Aluminumorthophosphate |
| Yttrium Aluminum Garnet (YAG) | with | Aluminumorthophosphate |
| Ceria | with | Aluminumorthophosphate |
| Silicon Carbide or Silicon Nitride | with | Polycarbosilane |
| Hollow Shapes of the Above | with | All Binders Listed Above |

These materials are slowly mixed together, usually with deionized water, to allow good dispersion. An acid, such as nitric acid, may be added to maintain the pH of the slurry infiltration solution in the range of approximately 3 to 4.

Figure 3:
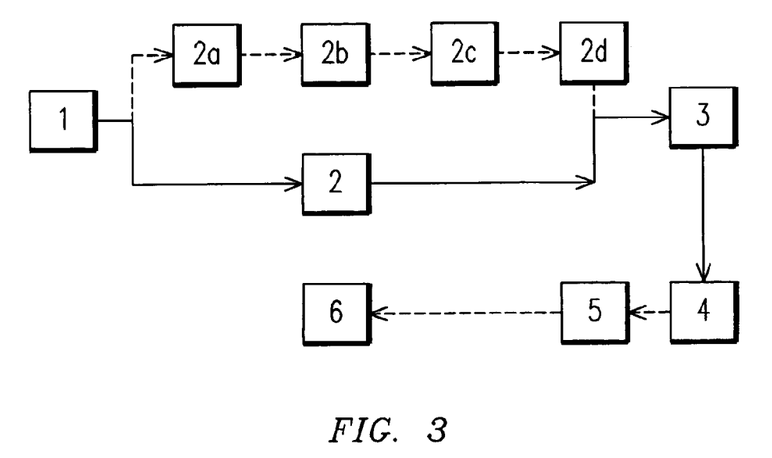
FIG. 3 is a block diagram illustrating exemplary steps in a method for manufacturing the insulating material of FIG. 2.

Referring now to FIG. 3, a diagram is shown of an exemplary method allowing fabrication of the composite material 10. By way of example, a "chamber" which is meant to include press or mold having a top, bottom and sides, or a similar apparatus, is provided to initially contain either the geometric shapes first or the binder first. In one case, shown by the dotted lines, the geometric shapes are placed into a chamber—step (2a), the chamber is closed—step (2b), preferably air is evacuated—step (2c), thereafter the binder, filled or unfilled, is fed into the evacuated chamber to impregnate the geometric shapes—step (2d), which shapes are substantially close packed, usually as required for the material desired. Usually, a low vacuum is used initially, followed by a higher level of vacuum, to insure complete impregnation of the interstices between the hollow spheres. For example, the vacuum can start at 1 inch (2.54 cm) Hg and be raised, over a period of several hours, to as high as 35 inches (89 cm) Hg. Total vacuum impregnation may take ten to fifteen hours.

In another case, multiple steps are combined, where the binder is placed in the chamber, after which the shapes are inserted and left to settle, and optionally vibrated into a close packed array; or originally slowly stacked as such an array in the binder—all step (2) shown by a continuous line in FIG. 3. In the first instance (using steps 2a-2d), close packing of the shapes in the array is of prime importance since the shapes are stacked first, before binder is applied. In the second instance (step 2 with continuous lines), complete filling of void spaces within the array is of prime importance since binder may be fed into the chamber first. In both cases there will be good permeation and penetration of the binder into the void spaces. The binder permeated packed array, no mater how accomplished, is then dried—step (3) followed by heating—step (4) and possibly sintering at a stepped temperature rate—step (5) and, optionally, binding to a substrate—step (6). The entire chamber can be heated up to about 80° C., with the impregnated micro spheres in place, as an initial heating step to remove excess water during step (3).

To insure that the impregnated micro sphere body will not crumble, the chamber with the body intact can be heated to about 400° C. before removing the body from the mold. After the body is removed, it can be further heated, in steps of 2° C. to 10° C. per minute, to 1000° C., to form a secure, unitary structure. To form a true refractory version, the body can be further heated, in steps of 3° C. to 10° C. per minute, to about 1600° C. and held for approximately four to five hours. If desired, the unitary body can also be vacuum infiltrated with a ceramic binder, such as aluminum hydroxyl chloride, with a stepped vacuum up to about 35 inches (89 cm) Hg, followed by heating and firing at temperatures ranging from 1200° C. to 1600° C.

Figure 4:
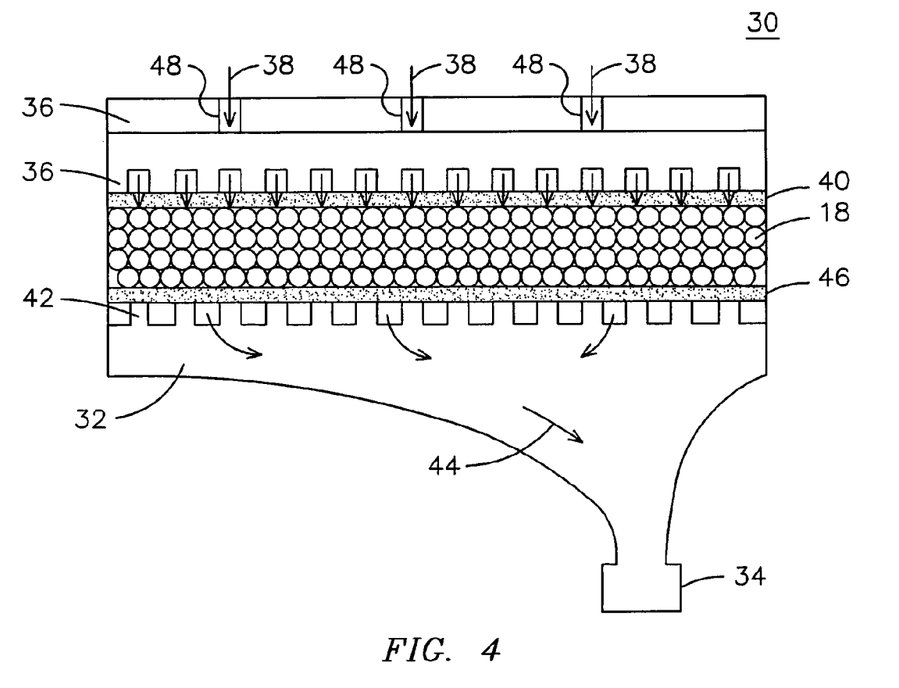
FIG. 4 is a schematic diagram of a vacuum/packing mold that may be used in the method illustrated in FIG. 3.

This manufacturing process may include vacuum impregnation using an inner and an outer mold as shown in FIG. 4. The inner shell 32 of the chamber 30 is connected to a vacuum system 34 capable of producing pressures to at least 30 mbar. The outer mold 36 consists of a rigid mold shell through which the binder slurry 38 can enter and pass and slowly infiltrate through the already packed spheres 18. It will be understood that, for example, other low profile cylinder shapes or the like could also be used. As is generally shown, the slurry 38 passes through an opening in the top of mold 36, to additional openings in the bottom part of mold 36, and then between spheres 18. At the top surface of the spheres, a porous layer 40 such as plastic meshing is applied to allow mold separation after pressing and filling. The inner mold 32 also consists of a rigid former 42 through which extracted liquid can be removed, as shown by arrow 44, as a result of vacuum impregnation of the particles. In addition to the plastic meshing on this side of the mold, an additional filter layer 46 is required that can effectively prevent any fine particles 22 (from FIG. 2) in the slurry 38 from passing through the inner mold. This is typically a filter that does not allow particles 22 to pass through, but does allow the liquid medium to pass through and to go into the vacuum system so that it can be collected. The porous layer 40 that provides for easy separation may be plastic based, is typically less than 0.5 mm thick and can be removed easily after infiltration or during partial firing of the entire assembly. The filter 46 is typically made of paper and is less than 0.25 mm thick and will burn away during the firing process leaving no residue.

In operation, impregnation of the spheres 18 is achieved preferably using a water-based slurry 38 that can enter through single or plural openings 48. The slurry may consist of a mixture of small particulates and binders, the function of which is to pack as effectively as possible in the spaces between the larger sphere's or particles' outer walls. The goal of the impregnation is to fill the interstices of the hollow sphere packed structure with small filler particles after drying. The water (or other specified liquid) is a carrier medium that transports the powder particles from outside the structure into the interior of the hollow sphere compact. The vacuum 34 then removes the carrier, leaving the solid particles and binder to fill the outer sphere spaces. The amount of slurry required can be calculated as a function of the available intersphere volume. Excess is preferred to ensure complete filling. The casting operation may be performed using overpressure rather than a vacuum in certain embodiments.

Particle size of any impregnated filler particle can be varied to affect the appropriate packing density required around the larger particles 18. A typical example of this combination could be coarse mullite ($3Al_2O_3.2SiO_2$) and fine alumina ($Al_2O_3$). The particle size ratio between large to small particles should be in the range of 8:1 to 25:1, preferably 10:1 to 15:1. When very small particles are used (5 micrometers or less), nitric acid may be added to the slurry to enhance separation of the particles in order to provide more effective infiltration.

As mentioned previously, after impregnation and drying, the body (in green form) may be detooled or partially detooled and dry fired at intermediate temperatures of from about 400° C. to 600° C. to impart some green strength. Subsequently, the green casting may be further infiltrated with a liquid-based binder. This may be completed either under atmospheric pressure or vacuum, depending on the viscosity of the binder. A number of liquid binder solutions can be used to form effective binding of the system. These include monoaluminum phosphate, aluminum hydroxyl chloride and ceramic sols that generate alumina, silica, aluminosilicate, yttria or zirconia solids. All of these binders dictate different and specific firing schedules. Alternately, a higher temperature firing of the green form can be used to sinter the structure together. This will give the most refractory form of the material, but the product will be more brittle. This factor may be important if finish machining is required to bring the coating segments to near net shape and therefore to minimize any machining requirements.

Potential applications of this method are to manufacture an insulating coating that can be used on semi-structural ceramic matrix composite components for gas turbines such as transitions, combustor liners, etc., and for insulating coatings for use on structural ceramic matrix composite components such as vanes. Other applications for the material system of this invention may include making materials for application as combustor liners (can, annular, and can-annular configurations), transition ducts, static airfoils and platforms (vanes), seals (both blade tip and interstage), and virtually any static surface exposed to a hot gas path. Aerospace applications include aircraft hot gas (engine exhaust) impinged structures and surfaces; thermal protection systems (TPS) for aerospace vehicles (hypersonic or re-entry protection); stiff, lightweight panels or structures for space systems (satellites, vehicles, stations, etc.), etc. Diesel or other ICE applications include cylinder liners, exhaust ports, header liners, etc.

Co-processing of the CMC material 12 and the insulating material 14 of FIG. 1 may facilitate the manufacturing of complex shapes and it may reduce manufacturing cycle time. The CMC material 12 may be based upon an alumino-silicate matrix material or an alumina matrix material, for example. The sinter bond provided by co-processing may also eliminate the need for a secondary bond-enhancing material 16. Co-processing may be accomplished by wet-processing of the insulating material 14 against the CMC material 12 to form a strong bond there between during a thermal curing step. To accomplish such co-processing the binder 24 of the insulating material 14 must be compatible with and must not degrade the CMC material 12. Furthermore, the shrinkage of the CMC 12 and insulation 14 must be considered during the drying and firing steps. The relative shrinkage of these two layers will affect the level of stress imparted there between. The manufacturing procedure disclosed above allows the insulating material 14 to be co-processed with a partially manufactured CMC material 12 in order to control the relative shrinkage there between.

In order to accept the wet insulation material 14 onto a surface of the CMC material 12, the CMC material 12 is first processed to a partially cured state. This state involves compaction of the layers of fabric 28 to achieve the required fiber volume fraction as required for the desired strength properties of the final product. The compaction process for the CMC may be achieved through either a process of hard face compression tooling or vacuum bagging. The "green" CMC is then dried and bisque fired at an intermediate temperature to develop limited strength in the CMC material to facilitate handling of the structure. The CMC material may be processed to any desired degree depending upon the amount of shrinkage desired during the subsequent firing process. A typical range of bisque firing temperatures for A/N720-1 material (Nextel® fibers in an alumina matrix) would be between 400-1,100° C. At 400° C. the shrinkage of the bisque CMC body would be practically zero. At 1,100° C. the shrinkage of the CMC body would be about 0.1%. Typically, most of the shrinkage of the CMC material occurs during the final firing of the CMC, which can be as high as or higher than 0.45% for example. Shrinkage of the insulating material 14 will depend upon the method used to pack the spheres 18. Insulating material 14 containing close-packed particles 18 may exhibit shrinkage of 0.1% to the fully fired condition. Insulating material 14 that is formed from pre-mixed slurry without close packing of the spheres 18 may exhibit shrinkage of 0.5% to the fully fired condition. By pre-shrinking the CMC material 12 to a predetermined degree considering the expected shrinkage of the insulating material 14 prior to applying wet insulating material 14, the relative shrinkage of the two layers during subsequent co-processing steps may be controlled. In one exemplary embodiment, the CMC material 12 may be bisque-fired to a temperature above 400° C. prior to applying the wet insulating material 14, and in another embodiment, the CMC material 12 may be bisque-fired to a temperature above 1,100° C. prior to applying the wet insulating material 14. The green body ceramic matrix composite material may be processed prior to the application of the insulating material to an extent necessary to essentially match shrinkage of the partially cured ceramic matrix composite material 12 to the shrinkage of the ceramic insulating material 14 during a subsequent co-curing step. Alternatively, the green body CMC material 12 may be processed to a state wherein shrinkage of the partially cured CMC material 12 is no more than the shrinkage of the ceramic insulating material 14 during the subsequent co-curing step. Alternatively, the CMC material 12 may be selectively bisque fired to a predetermined state that achieves a selected degree of shrinkage mismatch between the CMC material 12 and the ceramic insulating material 14 during the co-curing step.

Once the bisque CMC material 12 has been prepared, the wet insulating material 14 is applied to the surface of the bisque CMC 12. A pre-mixture of wet ceramic insulating material 14 may be applied to the surface of the bisque CMC, essentially using the CMC material 12 as one face of a mold. Alternatively, the hollow spheres 18 or other selected type of hollow or solid particles can be applied in a close packed array around the CMC 12 and then a slurry of matrix material 24 with or without filler material 22 may be administered under pressure or vacuum to the compacted sphere array. In either case, a tooling enclosure is required that will hold the wet insulating material 14 while it dries to form a green bond with the CMC material 12. The pre-mixture of wet ceramic insulating material 14 will likely shrink more than the infused close-packed array, since matrix material will reside between adjacent spheres 18 in the pre-mixture and will thus be prone to increased sintering during a subsequent firing cycle. In order to promote increased bonding strength between the CMC material 12 and the wet insulating material 14, a thin layer pre-coat of a ceramic adhesive or other bond-enhancing material 16 may be applied to the CMC material 12 prior to application of the wet insulating material 14.

After the wet insulating material 14 has been applied to the surface of the bisque fired CMC material 12, the material is then dried in air to remove excess liquid and is then fully fired to form the insulated CMC composite material 10. During the firing cycle the desired degree of relative sintering shrinkage of the two materials 12, 14 is achieved, thus forming a strong sinter bond between the two materials 12, 14. If the relative shrinkage is controlled to be perfectly matched or closely matched, i.e. within ±0.05% or alternatively within ±0.1% of each other, or alternatively within ±0.25% of each other a reduced level of residual stress between the two layers can be realized. Alternatively, this process can be used to manufacture a selected amount of mismatch in relative shrinkages, thereby allowing for selected pre-stressing of the composite 10 if desired. For example, if close-packed insulating material 14 is used, the CMC material 12 may be pre-cured to achieve shrinkage of about 0.30% prior to the application of the insulating material 14. Subsequent co-processing steps will result in final curing shrinkage of about 0.15% for the CMC material 12, which is within 0.05% of the final curing shrinkage of 0.1% of the close-packed insulating material 14. In another example where a slurry of the insulating material 14 is used, the CMC material 12 may be processed to only a green state with no pre-firing, since the shrinkage of the respective materials during the subsequent co-firing may be 0.45% and 0.50%, or within a desired 0.05%.

U.S. patent application Ser. No. 10/634,391 titled "Insulating Ceramic Based On Partially Filled Shapes" describes use of partially filled spheres in lieu of the hollow spheres described above. In this modification, spheres that comprise an interior skeletal structure and an outer skin substitute the stabilized hollow spheres for the thermally insulating composition. The low thermal conductivity of the structure is maintained by making the interior of the structure of relatively low spatial fill. In one exemplary embodiment, the fill material volume may be in the range from about 5% to 40% of the inner sphere volume (i.e., volume defined by the inside surface of the outer skin), with a preferred range from about 15% to about 20%. These ranges may be based on the ability of a skeletal structure formed around an array of close-packed shapes to support a framework. It will be appreciated that such shapes need not be limited to spheres since other shapes, such as oblate spheroids, or any other shape generally void of corners may work equally effective. Accordingly, although the present description may make reference to spheres, such terminology should be construed as exemplary and not as limiting terminology.

The thermal stability of the spheres, and hence that of the overall structure may be maintained by having the interior skeleton and/or the outside skin thermally stabilized. The structure thus behaves under high temperatures in the same advantageous manner as the structure based on hollow spheres, allowing for matrix densification and local shrinkage but maintaining the macroscopic dimensions by virtue of the contiguous array of stable spheres when such dimensional stability is desired.

It is recognized that partially filled spheres enable thin (potentially very thin) walled spheres supported by the internal skeletal structure (e.g., a 3-D skeletal structure having varying degrees of porosity, as an open foam, sponge-like structure, or a coral reef structure may respectively have) as the basis for the ceramic thermal insulation. In one exemplary embodiment, the partially filled spheres may be made from materials as those that are employed for hollow spheres and would similarly provide the thermal stability of the insulating composition by pre-firing the spheres at temperatures that are relatively higher than the temperatures the insulation is likely to experience during its operation. It will be appreciated that the internal structure need not be a 3-D skeletal structure. For example, it is contemplated such inner structure may be constructed as a shaft extending through the center of the sphere, or as a cruciform, or as an structure comprising multiple fingers extending through the interior of the sphere. This last structure may be conceptually analogized to the individual jack pieces (each with multi-branches) for playing the game of jacks.

In a composition comprising partially filled spheres, both the skin and the internal skeleton (but primarily the internal skeleton) may stabilize the structure of each sphere. The outer skin can therefore be much thinner than the skin required for a similar sized hollow sphere. In one exemplary embodiment the thickness of the outer skin of the sphere may range from about 0.1 mm to about 5 mm, with a preferred range from about 0.3 mm to about 1.5 mm. In one exemplary embodiment, the sphere wall thickness may be in the range from about 1% to about 30% of the sphere diameter with a preferred range from about 5% to about 10% of the sphere diameter. This range may vary based on obtaining an appropriate volume of free space to contribute to the thermal insulation properties of the insulating structure.

Figure 5:
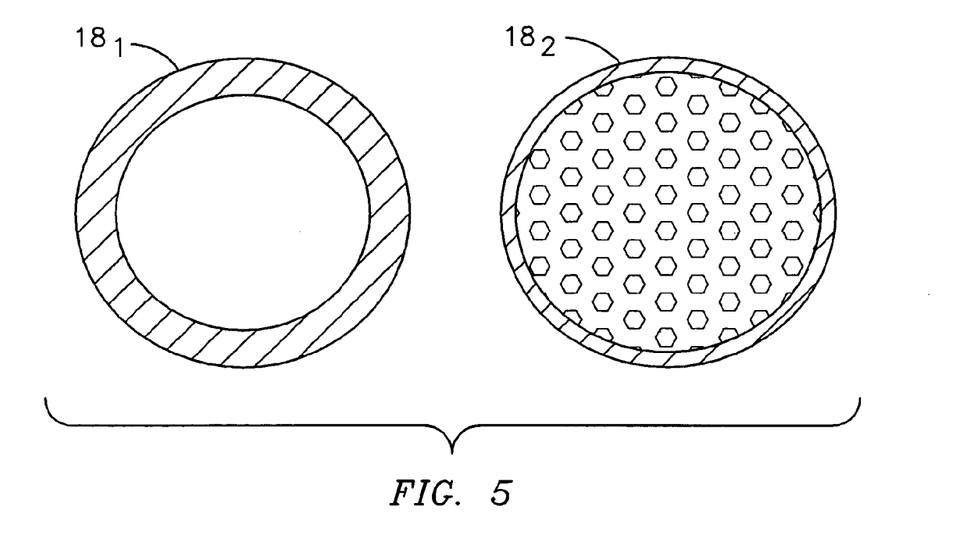
FIG. 5 comparatively illustrates some structural differences between an exemplary hollow sphere and an exemplary partially filled sphere as may be used in a high temperature insulation material embodying aspects of the present invention.

Because each skeleton-stabilized sphere comprises a relatively low-density material, the resulting structure is still essentially a low thermal conductivity material that can be advantageously employed to fabricate an insulating structure. FIG. 5 comparatively illustrates some structural differences between an exemplary hollow sphere $18_1$ and an exemplary partially filled sphere $18_2$.

In one exemplary embodiment, the materials for constructing the partially filled spheres could be those that are traditionally utilized for the hollow spheres, e.g., alumina, mullite, etc. These materials may be fabricated as a foam-like inner structure and then a second material may be applied as the outer layer. One advantageous aspect is the fact that the partially filled spheres may be also constructed out of materials that could be difficult to process for constructing a hollow sphere. For example, one could experience difficulty processing a particular material as a hollow sphere. However, in the case of the partially filled sphere, one may readily coat that material over the skeleton to just construct the outer layer.

Using this approach one could make the skeleton using any of the materials traditionally used for the hollow sphere, e.g., mullite, alumina, etc. One could then apply virtually any other desired material, such as any desired oxide, over the skeleton to construct the outer layer. That is, the universe of materials that one can use for constructing partially filled spheres may be substantially expanded compared to the choices that one has for hollow spheres because one can use the inner skeleton as the basis for applying an outer coating to form the partially-filled sphere.

Examples of other materials that may be used for constructing the inner skeleton may include silicon-based materials, such as silicon carbide, silicon nitride, etc. The increased usage of materials provides welcomed versatility to the designer since one may choose to include a given material to more precisely control certain properties of the insulating material, such as thermal conductivity, thermal expansion, etc.

It will be understood that other materials that are available as foamed systems may be employed equally effective: for instance the hollow structure "Flyash" waste from power plants may provide a very cost effective skeletal structure. In any of these cases, the partially filled shapes would exhibit the same advantageous properties as those achievable with hollow spheres plus its own unique advantages. For example, as the wall thickness of the partially filled spheres may be adjusted (thinned) due to the strengthening imparted by the interior skeleton, the local strength of the sphere wall against point forces may be decreased and the local "crushability" of the partially filled spheres may be increased. Incorporation of such spheres in a thermally insulating material would therefore be expected to provide a material with increased abradability, which may be desirable for certain applications.

By employing an inner, albeit open, structure and a sealing skin to the spheres, enhanced versatility in the processing of the thermally insulating material may be achieved. For example, if the inner skeletal structure is stabilized relative to thermal effects, the outer skin need not be as stable against such thermal effects. The outer skin may be allowed to sinter slightly thereby allowing densification of the thermally insulating structure. This capability could be employed during processing wherein the skin of the structure would be essentially moldable and during processing would conform relative to any adjacent spheres. Such a structure would be amenable to pressure assisted sintering, hot pressing and other similar fabrication processes, thereby broadening the processability of the thermally insulating material.

Another advantageous characteristic of partially filled shapes is that when one constructs the outer skin around the internal skeleton, one may maintain the basic skeleton shape, e.g., a spheroid, but may be a squashable spheroid. One may sufficiently displace the outer skin so that it allows pushing the spheroid into regions of the matrix that otherwise would comprise a void. One of the issues that one faces when packing an array of spheroids together is reducing voids between the spheroids. For example, the closest packing one may get in practical embodiments with hollow spheres is three spheres touching one another in a common plane, and an additional sphere stacked on an upper plane. Between these planes, there is typically an open space where one has to introduce material to fill such an open space. In one exemplary embodiment, that space may be about 27 volume percent of the rest of the array. In one exemplary embodiment, the moldable surfaces of each respective one of the four adjacent partially filled spheres would be sufficiently squashy that one may push the spheroids into one another and their skin material would be moldable to at least partially fill the space that would otherwise result. That is, one would be basically keeping the spheroid shape, however, one would be sufficiently deforming the outer skin to at least partially close the void that would otherwise result.

In yet another aspect, the potential for more broadly varying the engineering properties of the insulating system is presented. For example, in hollow spheres, the sphere material determines both the physical and chemical properties of the spheres, and, hence, the insulating structure. By providing a structural inner skeleton to control the physical and mechanical properties and an outer skin to protect the skeleton from the environment it would be possible to decouple the physical and mechanical behaviors of the spheres from the chemical and environmental behaviors. It might be possible for instance to use skeletal materials that are incompatible with the binding matrix and its processing by having an intermediate skin material providing a hermetic seal around the particles.

For various reasons, such as facilitating rapid reaction during processing, one may want to include a material in the interior of the sphere that could be chemically incompatible with the binding matrix material. In this case, the outer layer may provide an encapsulation function so that it isolates the inner material of the sphere from the binding matrix.

The description below describes innovative aspects that have been discovered by the inventors of the present invention regarding advantageous characteristics that can be imparted to a high temperature insulating material when the constituent matrix of the insulating material is processed to include filler material in the form of chopped fibers or other discontinuous fibrous materials. As elaborated in greater detail below, the discontinuous fibrous materials may be in the form of non-fugitive fibrous materials, fugitive fibrous materials, or a combination of such materials.

It is contemplated that the addition of discontinuous fibers, such as non-fugitive chopped fibers, will result in an improved friable graded insulation (FGI) ceramic insulating material that can provide relatively higher toughness (e.g., increased tensile strength) than would be provided otherwise. It is further contemplated that the addition of fugitive fibers to the (FGI) ceramic insulating material will provide relatively higher abradability than would be provided otherwise. Various exemplary FGI materials and methodologies for making such materials are described above and are further described in the various patents and applications cited in the paragraph of the present specification designated as "Related Applications and Patents".

One exemplary application where superior abradability characteristics are useful includes a gas turbine ring segment where the ring segment must withstand contact with a blade tip without sustaining structural damage. In this type of application, a turbine rotor having a number of blades may be positioned to rotate within the interior of the ring segment. Customarily, by reducing the clearance between the blade tips and the inner surface of the ring segment, one is able to reduce leakage of gas across the blade tips and thereby improve turbine efficiency. This can be effectively achieved by coating the inner surface of the ring segment with an abradable ceramic insulating material embodying aspects of the present invention, wherein rotation of the blades and contact with the inner surface causes wear of the insulating material to form sealing grooves in the insulating material. Typically, as the turbine blades rotate, such blades can radially expand due to centrifugal effects as well as heat expansion. For instance, the differential expansion rate between the rotor and the inner ring segment can result in the tips of the blades contacting the abradable insulating material and forming well-defined grooves in the coating without damaging either the coating and/or the ring segment. In this exemplary application, one will essentially form a custom-fitted seal for the turbine.

Figure 6:
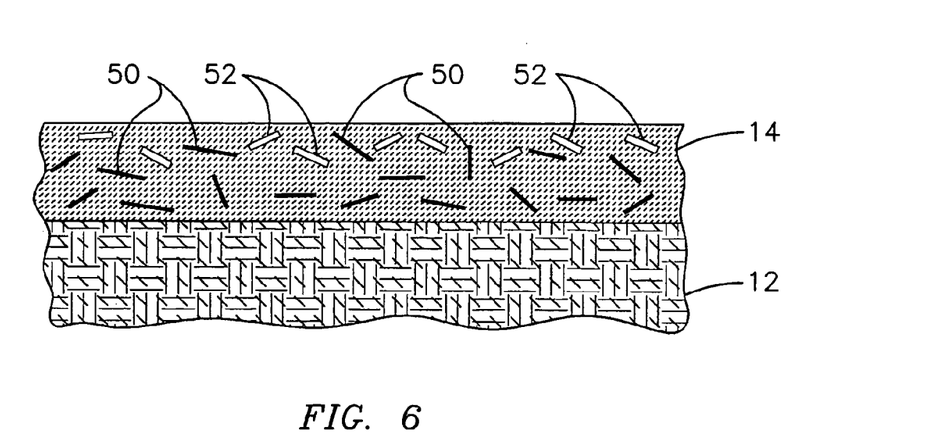
FIG. 6 is a partial cross-sectional view of the insulating material of FIG. 1 modified to include discontinuous fibers, such as non-fugitive and fugitive fibers, in accordance with aspects of the present invention.

The inventors of the present invention have discovered that one can achieve increased tensile strength in the insulating material 14 by the addition of non-fugitive chopped ceramic fibers 50, as illustrated in FIG. 6, to the matrix slurry composition. For simplicity of illustration, geometrical shapes such as the plurality of hollow spheres 18 shown in FIG. 1, are not illustrated in FIG. 6. It will be understood, however, that such geometrical shapes comprise one of the constituents of the insulating material 14.

The non-fugitive chopped fibers 50 may be oxide ceramic fibers, non-oxide ceramic fibers, or a combination thereof. For example, the oxide chopped ceramic fibers can include those commercially available from the Minnesota Mining and Manufacturing company under the trademark Nextel, including Nextel 720 (alumino-silicate), Nextel 610 (alumina), and Nextel 650 (alumina and zirconia). For another example, the non-oxide chopped ceramic fibers can include those commercially available from the COI Ceramics Company under the trademark Sylramic (silicon carbide), and from the Nippon Carbon Corporation limited under the trademark Nicalon (silicon carbide). In one exemplary arrangement, the length of the chopped fibers may range from approximately 150 μm to approximately 1000 μm. Another exemplary range that may be preferred for the length of the chopped fibers may be from approximately 250 μm to approximately 500 μm. In terms of concentration, the chopped fibers may range from approximately 5% to approximately 30% by volume of the matrix constituents. It will be understood that the foregoing ranges should be construed as illustrative and not as limiting being that the specific characteristics of the chopped fibers can be customized for the particular application. For example, a ring segment coating may require different properties than a vane segment coating. Examples of fiber characteristics that may be customized include fiber type, radius, length, amount, positioning, etc. Typically, the chopped fibers may be arranged in random fashion throughout the matrix composition. It is contemplated, however, that the chopped fibers could be oriented in any desired direction, such as generally parallel, perpendicular or otherwise disposed relative to the major length of the insulation material or relative to a direction of movement of a contacting part. For example, such a non-random fiber arrangement may be desirable at or near an interface boundary between the insulating material 14 and the CMC substrate 12 for increasing adhesion properties there between.

Figure 7:
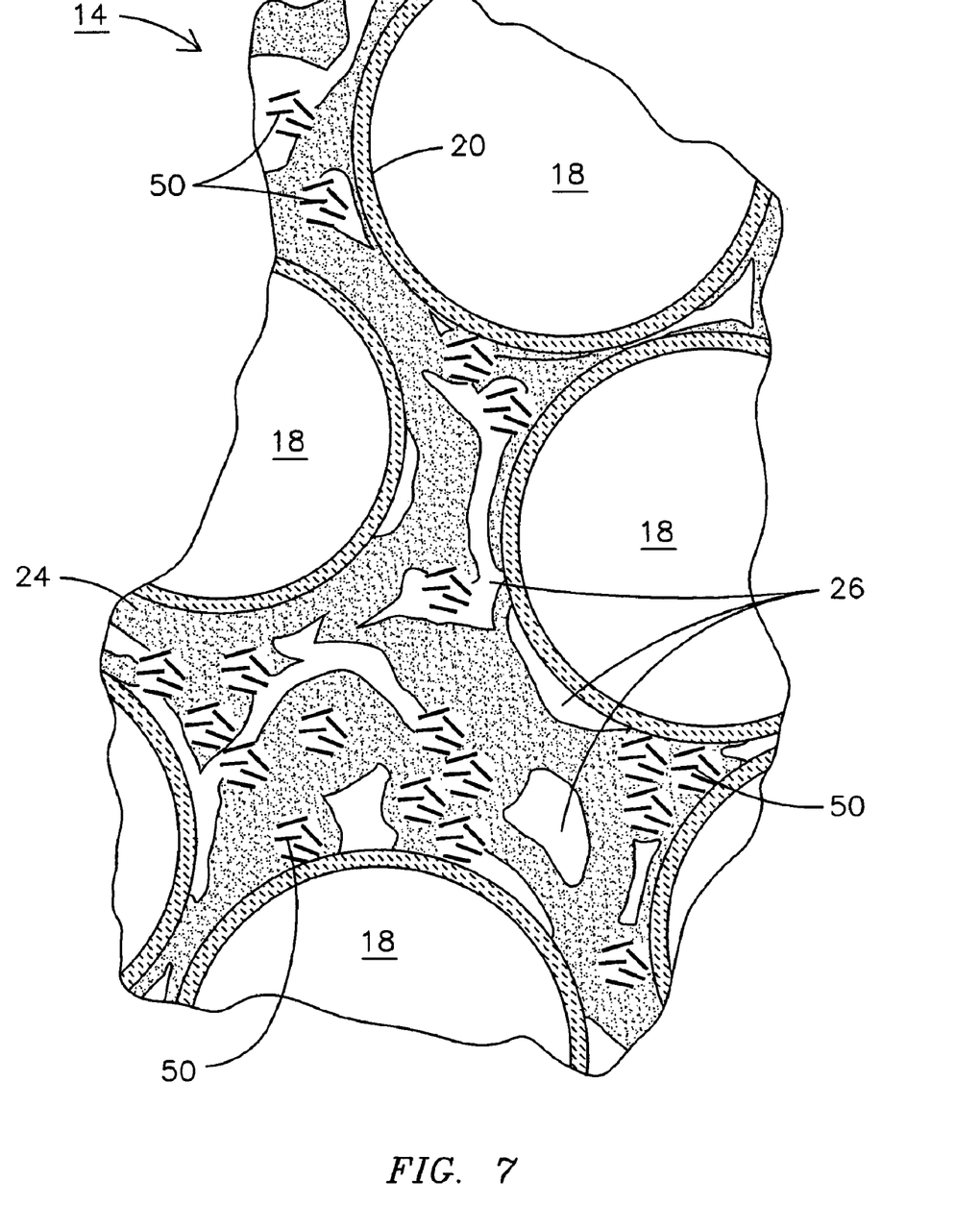
FIG. 7 is a partial cross-sectional view that illustrates additional details in connection with the insulating material of FIG. 6.

Another advantage that results from the addition of the chopped ceramic fibers is increased resistance to fractures in the insulating material 14. For example, as better appreciated in FIG. 7, it is contemplated that the chopped fibers 50 will act as obstacles or barriers for cracks or voids 26 that may develop and propagate within the insulating material. Moreover, it is contemplated that a chopped fiber as may be positioned across a crack will act as an anchoring or stitching structure between the two crack edges, thereby providing incremental structural toughness to the insulating material. Accordingly, another advantageous aspect related to the addition of the chopped ceramic fibers is the ability to reduce propagation of fractures that may occur in the insulating material.

Figure 8:
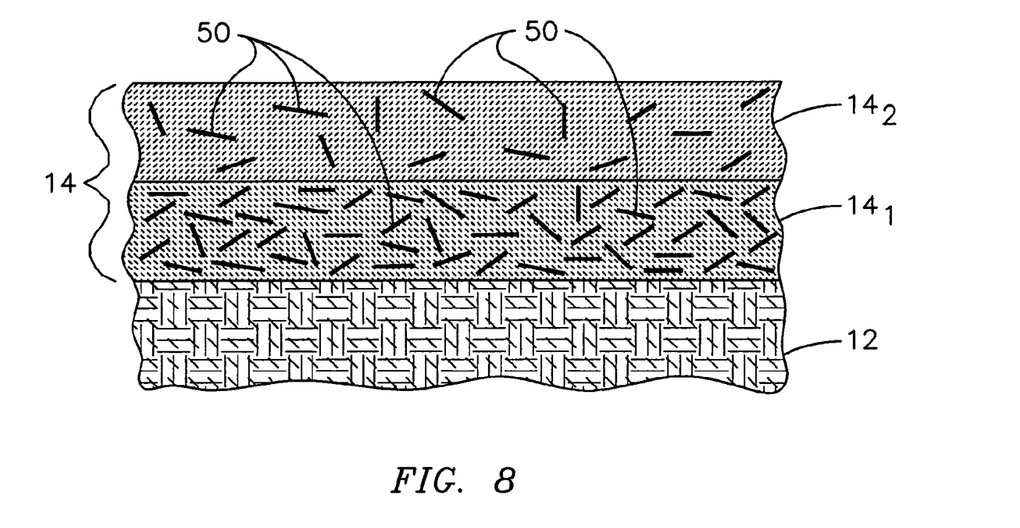
FIG. 8 is a partial cross-sectional view of an insulating material that may be formed of two or more layers, each having a respective chopped fiber concentration.
Figure 9:
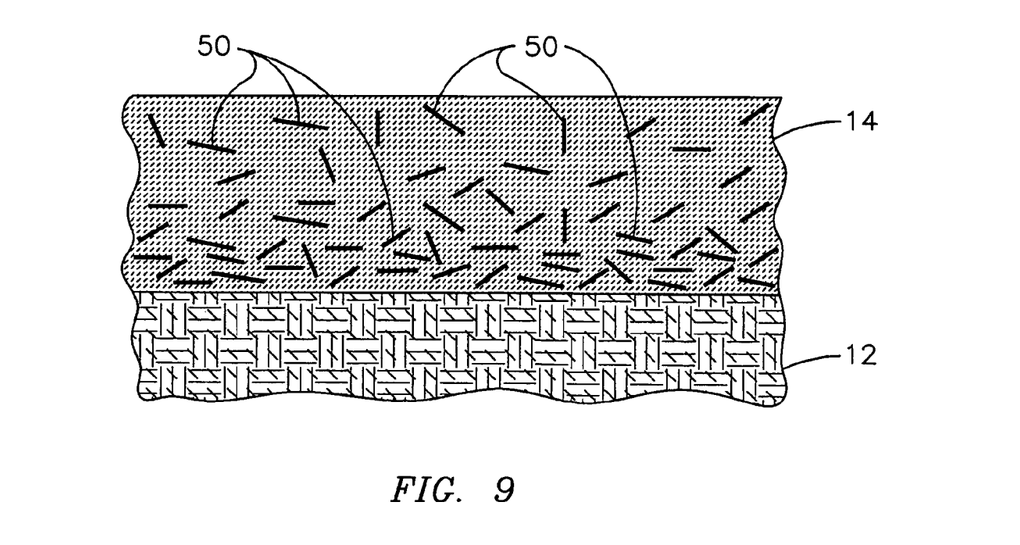
FIG. 9 is a partial cross-sectional view of an insulating material that may be formed of a single having a varying concentration of chopped.

As illustrated in FIG. 8, the insulating material 14 may be formed of two or more layers (e.g., a first layer $14_1$ and a second layer $14_2$) each having a respective chopped fiber concentration. For example, the first layer $14_1$ proximate the CMC substrate 12 may have a first concentration of chopped fibers, such as approximately 20% by volume of the matrix constituents. The second layer $14_2$ may have a second concentration of chopped fibers, different than the concentration of chopped fibers in the first layer, such as approximately 5% by volume of the matrix constituents.

As illustrated in FIG. 8, in lieu of providing an insulating material 14 made up of multiple layers with distinct concentration of chopped fibers, it is contemplated that one could provide a single layer construction having a varying concentration of chopped fibers. By way of example, this varying concentration of chopped fibers may exhibit a desired gradient as a function of thickness.

As noted above, the chopped ceramic fibers may be added to increase toughness to the insulating material 14 and in another exemplary embodiment, as shown in FIG. 6, fugitive chopped fibers 52 (e.g., carbon-based fibers, graphite-based fibers, polymeric based-fibers, graphite/polymeric and any combination of the foregoing) may be added to provide a selectable bulk density to the insulating material and thus impart a desired abradability to the insulating material.

As will be now appreciated by those skilled in the art, the addition of fugitive chopped fibers 52, (i.e., a fugitive that can be burned out during processing so as to create a void) allows offsetting some of the increase in toughness brought about by the addition of non-fugitive fibers 50 and thus improving the overall abradability of the ceramic insulating material. As will be further appreciated by those skilled in the art, the introduction of chopped fugitive fibers 52 results in a density reduction of the insulating material (e.g., the matrix microstructure). Controlling the size and/or quantity of the fugitive fibers can effectively control this density reduction. The examples discussed above regarding either multiple layers having distinct concentration with respect to one another or a single layer with a varying concentration or gradient are equally applicable to the chopped fugitive fibers.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An insulating material adapted for use in a high temperature environment for coating a turbine component, said material comprising:
   a plurality of geometric shapes comprising a three-dimensional array of hollow ceramic spheres;
   a binder for binding together the geometric shapes; and
   a first plurality of discontinuous fibers comprising ceramic fibers added to said binder, said discontinuous fibers adapted to controllably affect one or more properties of said insulating material.

2. The material of claim 1 wherein said plurality of ceramic fibers comprises a combination of oxide and non-oxide ceramic fibers.

3. The material of claim 1 wherein an amount of said ceramic fibers ranges from about 5% of volume of the insulating material to about 30% of volume of the insulating material.

4. The material of claim 1 wherein a length of said ceramic fibers ranges from about 150 μm to approximately 1000 μm.

5. The material of claim 1 wherein a length of said ceramic fibers ranges from about 250 μm to approximately 500 μm.

6. The material of claim 1 further comprising a second plurality of discontinuous fibers comprising a plurality of fugitive fibers.

7. The material of claim 6 wherein said plurality of fugitive fibers is selected from the group consisting of carbon-based fibers, graphite-based fibers, polymeric-based fibers, and any combination of the foregoing types of fugitive fibers.

8. The material of claim 6 wherein a concentration of said ceramic fibers is selected to controllably affect a tensile strength property of the insulating material, and a concentration of said fugitive fibers is selected to controllably affect a density property of the insulating material.

9. The material of claim 6 wherein said geometric shapes comprise a three-dimensional array of partially filled spheres in lieu of hollow ceramic spheres.

10. The material of claim 1 wherein the insulating material comprises a first layer having a first concentration of discontinuous ceramic fibers, and further comprises at least a second layer having a second concentration of discontinuous ceramic fibers, and wherein the value of the first concentration is distinct from the value of the second concentration.

11. The material of claim 1 wherein the amount of ceramic fibers in the insulating material is selected to define a gradient, wherein said gradient varies as a function of a distance relative to an interface boundary between said insulating material and a ceramic matrix composite material.

12. An insulating material adapted for use in a high temperature environment for coating a turbine component, said material comprising:
   a plurality of geometric shapes comprising a three-dimensional array of hollow ceramic spheres;
   a binder for binding together the geometric shapes;
   a plurality of discontinuous fibers comprising ceramic fibers added to said binder to reduce propagation of fractures in said insulating material; and
   a plurality of discontinuous fugitive fibers, wherein a concentration of said ceramic fibers is selected to controllably affect a tensile strength property of the insulating material, and a concentration of said fugitive fibers is selected to controllably affect a bulk density of the insulating material.

* * * * *